Jan. 30, 1934.    J. WHYTE    1,945,245
FRICTION DEVICE
Filed June 10, 1932    2 Sheets-Sheet 1
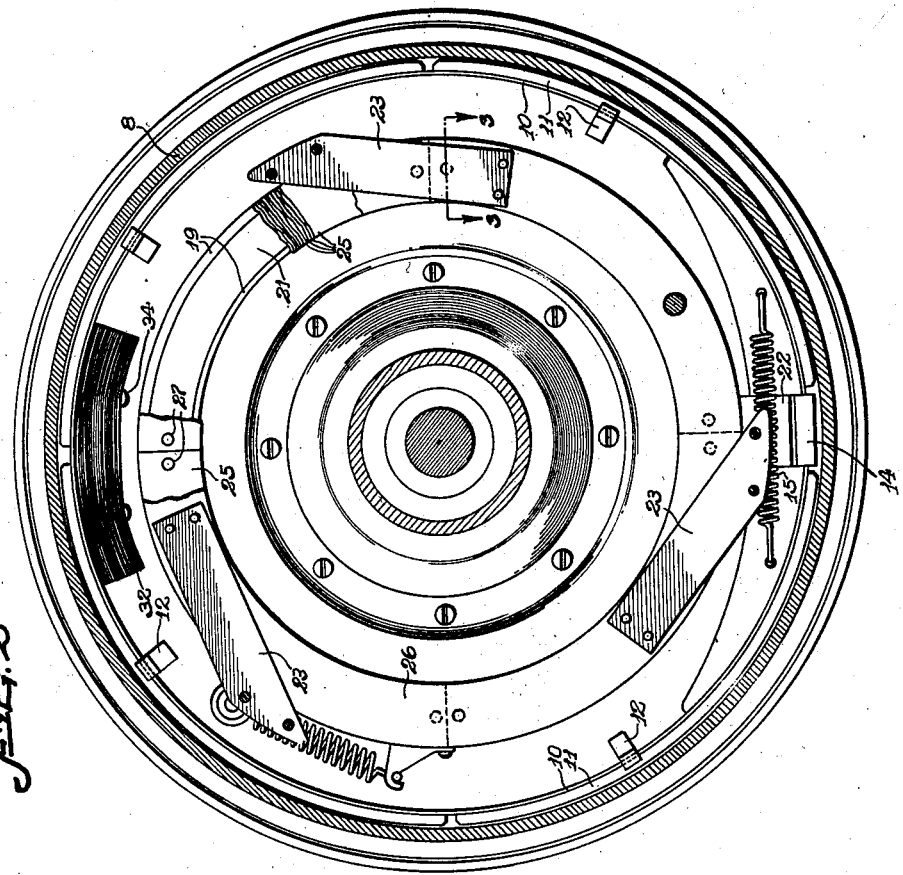
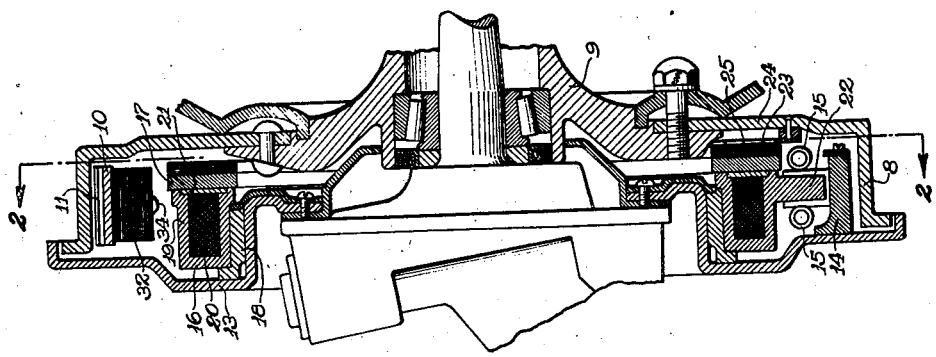
Inventor
John Whyte
By Chindahl, Parker & Carlson
Attorneys Jan. 30, 1934.  J. WHYTE  1,945,245
FRICTION DEVICE
Filed June 10, 1932  2 Sheets-Sheet 2
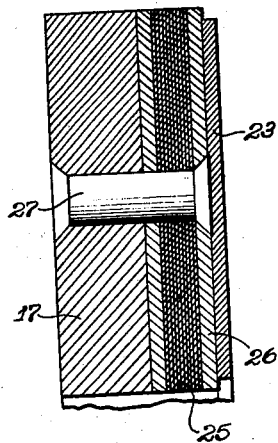
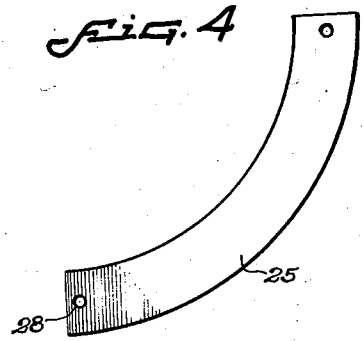
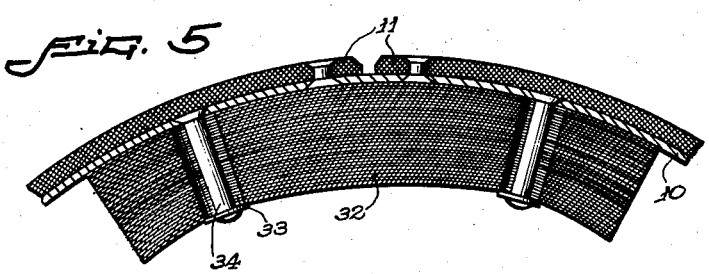
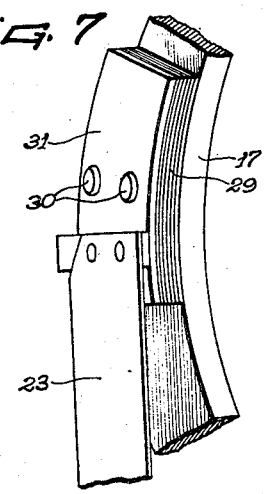
Inventor
John Whyte
By Chindah, Parker & Carlson
Attorneys Patented Jan. 30, 1934

1,945,245

UNITED STATES PATENT OFFICE 1,945,245

FRICTION DEVICE

John Whyte, Beloit, Wis., assignor to Warner Electric Brake Corporation, South Beloit, Ill., a corporation of Illinois Application June 10, 1932. Serial No. 616,375

14 Claims. (Cl. 188—140)

This invention relates to improvements in friction devices and more particularly to devices such as brakes or clutches in which the force producing the braking or clutching action is derived through the gripping engagement of two relatively movable friction elements. In devices of this character, there is a tendency for vibration of audible frequency to be set up in the coacting friction elements when the latter are brought into gripping engagement. Such vibration is objectionable not only because of the noise produced but because a marked decrease in the efficiency of the friction device results therefrom.

The primary object of the present invention is to provide novel means for preventing objectionable vibration in the operation of a friction device.

A more detailed object is to provide on one of the elements of a friction device a novel means for changing the natural frequency of vibration thereof to a value outside of the range of audibility.

A further object is to provide a vibration dampening means for friction devices capable of withstanding a relatively high temperature, which is substantially unaffected by thermal expansion relative to the friction element, and which is simple and compact in construction.

Other objects and advantages of the invention will become apparent from the following detailed description taken in connection with the accompanying drawings, in which Figure 1 is a fragmentary vertical section view of a vehicle wheel equipped with a brake having vibration dampening means embodying the features of the present invention.

Fig. 2 is a sectional view taken substantially along the line 2—2 of Fig. 1.

Fig. 3 is a sectional view taken substantially along the line 3—3 of Fig. 2.

Fig. 4 is an elevational view of a part of the vibration-dampening means.

Fig. 5 is a fragmentary sectional view of a friction braking element equipped with a modified form of vibration dampening means.

Fig. 6 is a perspective view of one of the parts of the vibration dampener shown in Fig. 5.

Fig. 7 is a fragmentary perspective view of a modified form of the vibration-dampening means.

In the drawings, the invention is illustrated in connection with an electro-magnetically controlled friction brake adapted for use on an automotive vehicle. The brake comprises a drum 8 rotatable with a vehicle wheel 9 and a flexible metal band 10 carrying segments 11 of friction material and extending around and supported concentric with the inner drum surface as by lugs 12 projecting from the non-rotatable anchor plate 13. The adjacent ends of the band are disposed on opposite sides of an anchor lug 14 and normally urged by springs 15 against the lug.

The brake operator shown herein for expanding the band 10 to press the segments 11 into gripping engagement with the drum is of the so called momentum type comprising two magnetic rings 16 and 17 adapted for axial gripping engagement. In the present instance, the ring 16 is loosely supported by the anchor plate through the medium of a bearing 18 and is of U-shaped cross-section forming two annular magnetic poles 19 between which is a winding 20. Segments 21 of friction material are mounted between the poles flush with the faces thereof. Rigid with the magnet ring is a lug 22 disposed between the ends of the band and adapted upon movement of the magnet in either direction away from normal brake-released position (Fig. 2) to move one or the other ends of the band away from the lug 14 thereby expanding the band.

The armature ring 17, which preferably is substantially flat and relatively thin, is mounted on the drum 8 for floating axial movement through the medium of a plurality of annularly spaced and tangentially arranged metal strips 23, each having its opposite ends secured respectively to the drum flange 24 and the back of the armature ring 17. The strips are initially stressed to maintain light mechanical contact at all times between the cooperating friction faces of the magnet and armature rings.

When the magnet is energized with the vehicle wheel rotating, the magnet and armature are drawn into firm gripping engagement with the result that the magnet is carried in the direction of rotation of the wheel, moving one end of the band 10 away from the stop 14 thereby expanding the band. After the clearance between the band and the drum has been taken up, the motion of the magnet is arrested and slippage takes place between the friction faces of the two rings, the brake being held set so long as the magnet remains energized. Upon deenergization of the magnet, the springs 15 contract the band and return the magnet to brake-released position.

In the operation of the brake above described, vibration tends to develop in the armature ring 17 and in the band 10, the vibration waves traveling in the direction of relative rotation between the band and the drum. In most instances, the frequency of such vibration is within the range of audibility producing harsh sounds or "squeaking" during application of the brake. The present invention contemplates associating with each of the vibrating elements a nonresonant mass of material having a definite weight relation to the period of vibration of the element and acting to change the frequency of vibration to a value outside of the range of audibility. Any preferred material, such as lead which will not sustain the sound waves due to such vibration, may be employed. Owing, however, to the limited space available in vehicle brakes and to the relatively high temperatures to which the friction elements are exposed in friction devices, it is preferred to employ a series or stack of relatively thin laminations, preferably of sheet metal, clamped to the friction element on the side thereof opposite its friction surface. It has been found that strips of steel from .007 to .009 inches in thickness will form a body having the desired nonresonant characteristics. If desired, these strips may be coated with tin or otherwise treated to prevent corrosion.

The nonresonant body on the armature ring 17, in the form of the invention shown in Figs. 1 to 4, comprises four sets of segmetal laminations 25 disposed between the armature and a plate 26 to which the supporting strips 23 are secured. Preferably the laminations are of substantially the same width as the armature ring and of a length substantially shorter than the circumference of the ring. Rivets 27 extending through the plate 26 and holes 28 in the laminations clamp the latter firmly to the armature. In the form shown in Fig. 7, laminations 29 of relatively shorter lengths are employed, being secured to the armature by rivets 30 extending through a plate 31 near the center of the laminations. By spacing the clamping means a short distance from the edges of the laminations, the latter are left free which has been found to improve the nonresonant characteristics of the body.

A similar vibration dampening means is provided for the brake band 10, there being one stack of laminations 32 employed in the present instance. This stack is mounted on the side of the band opposite the segments 11 and for maximum effectiveness is preferably located about midway between the opposite ends of the band. Approximately one hundred strips are employed, each being formed with slots 33 through which extend rivets 34 by which the stack is clamped to the band, leaving the edges of the individual laminations substantially free. The slots 33 allow for uneven longitudinal thermal expansion between the band and the laminations.

In dampening out objectionable vibration of the friction elements, the nonresonant bodies above described operate to change the frequency or amplitude of the friction elements to a value outside of the range of audibility. For obtaining maximum effectiveness, there appears to be a definite relation between the total mass of the nonresonant body and the natural period of vibration of the friction element on which the body is mounted. The weight of the body also will vary with the nonresonant characteristics of the body, the location thereof on the friction element, and the thickness of the laminations. It has been found that thin laminations are more effective and that the body is most effective when located about midway between the ends of the friction element.

This application is a continuation in part of my copending application Serial No. 334,886, filed January 25, 1929.

I claim as my invention:

1. An electromagnetic friction device comprising a magnet ring of U-shaped cross-section, a flat armature ring adapted for gripping engagement with the face of said magnet, and a stack of sheet metal laminations clamped to the side of said armature ring opposite said magnet.

2. In a friction device, the combination of an elongated friction element adapted for gripping engagement with and for relative movement with respect to a cooperating friction member, a stack of sheet metal laminations shorter than said element, and means clamping said laminations together and against said element on the side of the latter opposite its friction surface.

3. In a friction device, the combination of an elongated friction element adapted for gripping engagement with and for relative movement with respect to a cooperating friction member, a stack of sheet metal laminations clamped to said element on the side thereof opposite its friction surface and approximately midway between its ends.

4. In a friction device, the combination of an elongated friction element adapted for gripping engagement with and for relative movement with respect to a cooperating friction member, and a stack of thin laminations on the side of said element opposite its friction surface and means spaced from the edges of said laminations and extending through the laminations to clamp them firmly together and against said element.

5. In a friction device, the combination of an elongated friction element adapted for gripping engagement with and for relative movement with respect to a cooperating friction member, and a thin sheet metal strip lying against said element on the side thereof opposite the friction surface of the element and clamped to the element intermediate the edges of the strip.

6. In a friction device, the combination of cooperating friction elements adapted for relative movement while in gripping engagement with each other, a stack of thin sheet metal laminations each having spaced elongated slots therein, and clamping means extending through said slots and securing said laminations together and to one of said elements.

7. In a friction device, the combination of cooperating friction elements adapted for relative movement while in gripping engagement with each other, a stack of thin laminations lying against one of said elements, and means clamping the laminations together at a point spaced from the edges thereof and securing the stack to said last mentioned element leaving the edge portions of the laminations free.

8. In a friction device, the combination of cooperating friction elements adapted for relative movement while in gripping engagement with each other, and a stack of thin laminations secured to one of said elements to form a nonresonant body thereon.

9. In a friction device, the combination of cooperating friction elements adapted for relative movement while in gripping engagement with each other, a series of elongated laminations stacked together and extending in the direction of relative motion between said elements, and means clamping said laminations together and securing the stack to one of said elements.

10. In a friction device, the combination of a pair of friction elements arranged for gripping engagement and relative motion, and a laminated nonresonant body carried by one of said elements.

11. In a friction device, the combination of a pair of friction elements arranged for gripping engagement and relative motion, and a nonresonant body adapted to receive from one of the elements the vibrations thereof resulting from a gripping engagement of the elements and acting to change the period of vibration of the elements to a value outside the range of audibility.

12. In a friction device, the combination of a pair of friction elements arranged for gripping engagement and relative motion, and a nonresonant body mounted on and of a weight bearing a predetermined relation to the natural period of vibration of the element, said body acting by virtue of its nonresonant character to change the frequency of vibration of the element to a value outside of the range of audibility.

13. In a friction device, the combination of a pair of friction elements arranged for gripping engagement and relative motion, and a body of nonresonant material mounted on one of said elements and acting to change the natural frequency of vibration thereof to a value outside of the range of audibility.

14. A friction brake comprising a rotatable drum, a friction element extending around a cylindrical surface of said drum and adapted to be pressed into engagement therewith, and a stack of sheet metal laminations secured to the side of said element opposite said surface.

JOHN WHYTE.